United States Patent Office 3,790,644
Patented Feb. 5, 1974

3,790,644
PLASTIC COMPOSITIONS BASED ON POLY
(VINYL CHLORIDE) AND CONTAINERS
MANUFACTURED THEREFROM
Marc Obsomer, Brussels, Belgium, assignor to Solvay &
Cie, Brussels, Belgium
No Drawing. Filed Aug. 26, 1971, Ser. No. 175,321
Claims priority, application France, Sept. 2, 1970,
7032003
Int. Cl. C08f 15/06
U.S. Cl. 260—876 R                          6 Claims

ABSTRACT OF THE DISCLOSURE

The plastic compositions are based on poly(vinyl chloride) and contain in addition from 0.1 to 5% by weight of a resin obtained by polymerizing vinyl chloride in the presence of an ethylene polymer having a melt index of 0.3 to 40 and at least one characteristic selected from (a) 0.2 to 4 double bonds per 1000 carbon atoms and (b) 5 to 30 methyl groups per 1000 carbon atoms and under a partial pressure of vinyl chloride which is always below the saturated vapor pressure of vinyl chloride at the polymerization temperature, the total amount of ethylene polymer in said resin being $\leq 2.5\%$ by weight with respect to the poly(vinyl chloride) base. The compositions are readily processed into hollow containers which are transparent, substantially colorless, and have excellent resistance to aging and good thermal resistance.

BACKGROUND OF THE INVENTION

The present invention relates to plastic compositions based on poly(vinyl chloride) which are particularly suitable for the manufacture of hollow bodies and especially of transparent bottles.

Hitherto, the poly(vinyl chloride) usually used for the manufacture of hollow bodies, bottles, flagons, etc., has been a low molecular poly(vinyl chloride), having a Fikentscher K value, measured in 1,2-dichloroethane, comprised between 52 and 55. Such poly(vinyl chloride) allows the manufacture of bottles having desirable properties; however, when using compositions based on this product, it is impossible to mold at the highest production rate permitted by modern machinery. The incorporation of additives is necessary to make processability easier. However, these additives are harmful to the quality of the resultant products.

On the other hand, it is known that the mechanical properties of the bottles can be improved by using high molecular weight poly(vinyl chloride). However, up to now, tests with high molecular weight poly(vinyl chlorides) and more particularly, those with a Fikentscher K value, measured in 1,2-dichloroethane, comprised between 58 and 68, have not been successful; the polymer degrades during the work-up. However, it is possible to manufacture bottles from these poly(vinyl chlorides) by incorporating additives which facilitate the extrusion and avoid the gluing of material in the extruder, and fillers which promote gelification during the work-up and improve the impact resistance of molded containers.

The hollow bottles manufactured using compositions based on poly(vinyl chloride) and the usual additives and more particularly methyl methacrylate/ethyl acrylate co-polymers, marketed under the trade name Paraloid K 120 N, present a bad surface appearance, a low thermal stability and in addition, a very pronounced initial color; in fact they become yellow after a relatively short time. Thus, the known additives do not allow the manufacture of molded hollow bottles or other hollow containers having the required properties.

SUMMARY OF THE INVENTION

The object of the present invention is to provide plastic compositions comprising poly(vinyl chloride) which can be converted into hollow bodies, which do not present the above-mentioned disadvantages.

According to the present invention, compositions are provided comprising poly(vinyl chloride) and from 0.1 to 5% by weight based on the weight of the poly(vinyl chloride) of a product obtained by polymerizing vinyl chloride in the presence of an ethylene polymer having a melt index of 0.3 to 40 and having 0.2 to 4 double bonds per 1000 carbons and/or 5 to 30 methyl groups per 1000 carbons, and under a partial pressure of vinyl chloride which is always below the saturated vapor pressure of vinyl chloride at the polymerization temperature, the amount of ethylene polymer incorporated in the product being equal to or less than 2.5% by weight with respect to the poly(vinyl chloride) base.

DESCRIPTION OF THE INVENTION

It has been found that the addition of small quantities, i.e. from 0.1 to 5% by weight, and more preferably from 0.2 to 2% by weight, of a graft polymerization product obtained by polymerizing vinyl chloride in the presence of an ethylene polymer having particular characteristics, as set forth above, and under a partial pressure of vinyl chloride which is constantly below the saturated vapor pressure of vinyl chloride at the polymerization temperature in a poly(vinyl chloride) resin, greatly facilitates the processability of the poly(vinyl chloride) and especially of high molecular weight poly(vinyl chloride). Thus, the incorporation of a small quantity of the graft polymerization product which contains a graft polymer of vinyl chloride on ethylene polymer and unmodified ethylene polymer, in such an amount that the quantity of ethylene in the composition is equal to or less than 2.5% by weight with respect to the poly(vinyl chloride) base material, allows the manufacture of transparent containers which have been manufactured only with low molecular weight resins up to the present time.

The effect of the addition of the present graft polymerization product is greater than that of well-known compounds which have been used in the past, such as methyl methacrylate/ethyl acrylate copolymers (Paraloid K 120 N) and low density finely divided polyethylenes (Microthenes FN 500 and MN 710). Furthermore, the compositions of the present invention allow the manufacture of transparent containers having a good surface appearance, little or no initial color, excellent resistance to aging and good thermal stability, in contrast to compositions containing the usual additives such as those aforesaid.

In order to improve the impact resistance of the compositions of the present invention, without influencing negatively the excellent characteristics thereof, from 0.5 to 20% by weight of one or more fillers may be added. One of the important characteristics of the present invention is that the use of the graft polymerization product containing the graft polymer, vinyl chloride/ethylene copolymer and ethylene polymer readily permits the conversion of compositions based on high molecular weight poly(vinyl chloride) into bottles without deterioration of the aforesaid excellent properties of the composition. Thus, the proportion of fillers usually used in poly(vinyl chloride) compositions which are to be processed into hollow containers or the like may be reduced by half. In most cases by using such a reduced quantity of filler, the impact-resistance of the container or other product is also improved.

Moreover, the processing is particularly economical and the price of the composition can thereby be substantially reduced. In particular, industrial molding machines can run at a higher rate of productivity using the compositions according to the invention wherein the poly(vinyl chloride) base material is a low molecular weight poly(vinyl chloride). On an industrial extruder, molding can be carried out for a longer period of time and at a higher rate of production using the compositions of the present invention instead of known compositions, in view of the fact that during the processing no notable deposits or degradation of the composition occurs in the extruder.

Moreover, the quality of the products and more particularly their good surface appearance and excellent thermal stability are not reduced during extrusion even after a relatively long period of time.

Improved processability and productivity of industrial machines has also been observed during the proceeding of compositions based on high molecular weight poly(vinyl chloride).

By high molecular weight poly(vinyl chloride) is meant poly(vinyl chloride) having a Fikentscher K value, measured in 1,2-dichloroethane, of higher than 57 and more particularly comprised between 58 and 67, and by low molecular weight poly(vinyl chloride) is meant poly(vinyl chloride) having a K value of less than 57 and more particularly comprised between 52 and 55. The method for the K value determination is described in Cellulose-Chemie, 13, 160 (1932).

The poly(vinyl chloride) which constitutes the basic material of the compositions of the present invention is a vinyl chloride homopolymer or copolymer containing more than 80% by weight of vinyl chloride. The method of polymerization used to obtain the poly(vinyl chloride) is not critical and any of the known polymerization processes may be used. Among such well-known techniques, for example, the polymerization may be carried out by mass, emulsion or suspension polymerization as well as by polymerization in the gas phase, according to Belgian Pat. 686,088 issued to Solvay & Cie. However, preferably, poly(vinyl chloride) obtained by suspension, mass or gas phase polymerization is used in order to manufacture transparent bottles most advantageously.

The products which are added to poly(vinyl chloride) to form compositions particularly suitable for the manufacture of hollow bodies in accordance with the present invention are obtained according to the process described in the French patent application No. 7025058, filed on July 6, 1970, which corresponds to copending U.S. application Ser. No. 160,100, filed July 6, 1971. According to this process, polyethylene having particular characteristics is used as the starting material and the polymerization is carried out under specific conditions, namely, under a partial pressure of vinyl chloride which at all times is below the saturated vapor pressure of the vinyl chloride at the polymerization temperature.

The ethylene polymers which are used as the backbone polymers are ethylene homopolymers and ethylene copolymers with a small quantity of another α-olefin, preferably containing from 0.4 to 6 mole percent of another α-olefin and which have the following properties:

A melt index (ASTM D1238–57T) comprised between 0.3 and 40;

A number of double bonds per 1000 carbon atoms comprised between 0.2 and 4 (measured by infrared spectrophotometry) and/or a number of methyl groups per 1000 carbon atoms comprised between 5 and 30 (measured by infrared spectrophotometry).

The ethylene polymers disclosed in French Pat. 1,466,376, which corresponds to U.S. 3,526,616, are particularly suitable for carrying out the invention.

The graft polymerization process may be carried out in aqueous suspension or in bulk, usually at a temperature of about 40 to 110° C. The proportion of ethylene polymer to vinyl chloride monomer during the reaction is such that substantially all of the vinyl chloride is absorbed by the ethylene polymer and thus, substantially all of the vinyl chloride introduced into the polymerization reaction is polymerized in direct contact with the polyethylene backbone polymer. Products obtained in this manner have been found to have a combination of specific and highly desirable characteristics for the preparation of poly(vinyl chloride) compositions intended for the manufacture of hollow bodies and especially bottles. These products have particularly excellent structural homogeneity, because the vinyl chloride introduced into the autoclave is also absorbed by the backbone polymer and polymerized in direct contact therewith. There is no formation of homopolymers of vinyl chloride in aqueous suspension, outside of grains of the backbone polymer.

The following technique is preferably used in the preparation of these products: The water, suspension agent and the ethylene polymer are introduced in determined proportions, to an autoclave subjected to continuous agitation. The introduction of the catalyst is followed by the introduction of vinyl chloride in such quantity that, at the polymerization temperature, the partial pressure of the vinyl chloride is always below the saturated vapor pressure thereof. At the end of the reaction, the unconverted vinyl chloride is released, and after filtration, washing and drying, the thus obtained graft polymer product is collected. The quantity of ethylene used in the preparation of the graft polymerization products used for the compositions of the present invention depends on the type and composition of the desired product. However, it is preferable to use a product containing about 30 to 70% by weight of total ethylene polymer, which is present as graft polymer and in an unmodified state. Furthermore, the graft polymerization process is carried out in such a manner that the product is comprised of 25 to 70% by weight of graft polymer, the remainder being constituted by ungrafted poly(vinyl chloride) and unmodified polyethylene. The proportion of both nongrafted poly(vinyl chloride) and unmodified polyethylene in the ungrafted polymer is about 40 to 60% by weight of the ungrafted polymer.

The thus obtained graft polymerization products are used in an amount of from 0.1 to 5% by weight and more preferably, from 0.2 to 2% by weight, with respect to the poly(vinyl chloride) base material. Moreover, the total quantity of ethylene polymer in the compositions of the invention, i.e. the ethylene polymer content of the graft polymer and of the nongrafted ethylene polymer must be equal to or less than 2.5% by weight with respect to the poly(vinyl chloride) base material. If this condition has not been respected, it is impossible to obtain transparent containers; opalescence becomes more pronounced with increasing quantities of ethylene above the limit of 2.5% by weight.

The compositions in accordance with the present invention may contain in addition, from 0.5 to 20% by weight based on the weight of poly(vinyl chloride) base of a filler which may be selected from compounds, well known to those in the art, which improve the impact-resistance of resins and especially from polymers obtained by grafting on polybutadiene or on a butadiene/styrene copolymer, methyl methacrylate, or styrene, or acrylonitrile and methyl methacrylate or styrene, acrylonitrile and methyl methacrylate, or styrene and ethyl and methyl methacrylate.

Any filler which is useful for improving the impact-resistance of poly(vinyl chloride) may be incorporated in the present compositions. Such fillers are also known as impact-modifiers and have been disclosed for example, in Polyvinylchloride, By Harold A. Sarvetnick, Rheinhold Plastics Applications Series, edited by Van Nostrand Reinhold Company, pp. 119–124, whcih is incorporated herein by reference. As pointed out therein, resins commercially employed as impact modifiers include acrylic copolymers, ABS resins, chlorinated polyethylene, ethylenevinyl acetate copolymers, fumaric ester copolymers, and graft copolymers such as ethylene-vinyl acetate on a PVC backbone.

The manufacture of compositions of the present invention can be carried out by any of the techniques well known in the art and particularly by the hot mixing of the ingredients especially on a cylinder mixture. The present plastic compositions are especially suitable for the manufacture, by extrusion and blowing, of various hollow bodies such as bottles, flagons and other containers intended for packing liquids and solids.

The following examples further illustrate the best mode currently contemplated for carrying out the present invention, except those examples which include the letter R which are outside the invention and have been set forth for purposes of comparison. The examples of the invention must not be construed as limiting the invention in any manner. In all the examples, all quantities are in parts by weight unless otherwise noted.

EXAMPLES 1 TO 13

The following examples are given in order to show the excellent properties of the graft polymers of the invention as additives making the processability easier, and also the good qualities of the obtained bottles.

The Examples $R_1$ to $R_4$ are given by way of comparison.

The products A, B and C have been obtained according to the process described in Examples 1 to 6 of French patent application 7025058 of July 6, 1970, as follows:

In an autoclave of 5 l. subjected to continuous agitation (450 revolutions per minute), with the aid of a two-blade agitator inclined at 45°, the following is introduced: water, suspension agent and polyethylene. After the introduction of the catalyst, the vinyl chloride is introduced in such a quantity that at the temperature of polymerization (68° C.), the partial pressure of the vinyl chloride is lower than the saturated vapor pressure of vinyl chloride at 68° C., namely 11.6 kg./cm.2. When the pressure has dropped to at least half its maximum value, the non-transformed gaseous vinyl chloride is removed. After filtering, washing and drying, the product obtained is collected.

The graft polymerization products A, B and C have been obtained by polymerization of 50 parts of vinyl chloride in the presence of 50 parts of ethylene polymer. The nature and the characteristics of the ethylene backbone polymers used for the products A, B and C are indicated in Table 1. The graft polymerization reactions have been carried out in the presence of 1750 parts of water, 1.5 parts of lauroyl peroxide and poly(vinyl alcohol) in respective amounts of 9 parts for product A and 0.9 part for products B and C. The periods for the polymerization reactions are respectively, 4 hours for product A, 5 hours for product B and 3.5 hours for product C.

TABLE 1.—CHARACTERISTICS OF THE ETHYLENE POLYMER USED AS BACKBONE POLYMER

| | Product | | |
|---|---|---|---|
| | A | B | C |
| Nature | (1) | (2) | (3) |
| Melt index (g./10 min.) according to norm ASTM D 1238-57T | 22 | 21 | 2.2 |
| Density (g. cm.³) according to norm ASTM D 1505-57T | 0.916 | 0.919 | 0.926 |
| Granulation (mm.) | 0.3 | 4.7 | 2.5 |
| No. of double bonds per 1,000C | 0.73 | 0.64 | 0.21 |
| No. of methyl groups per 1,000C | 17 | 16 | 15 |

[1] Low density polyethylene, powder obtained by crushing.
[2] Low density polyethylene extruded granules.
[3] Ethylenebutene copolymer, fluff.

The graft polymerization products A and B both contain 25% of poly(vinyl chloride), 50% of pure graft polymer containing 50 parts of vinyl chloride and 50 parts of ethylene, and 25% of polyethylene.

The product C contains 30% of poly(vinyl chloride), 40% of pure graft polymer containing 40 parts of vinyl chloride and 60 parts of ethylene, and 30% of polyethylene.

The stabilizer used is an octyltin mercaptide, marketed under the trade name, Advastab 17 MO.

The incorporated lubricant is a 50/50 mixture of cetyl and stearyl alcohols, marketed under the trade name Stenol PC.

The compositions are obtained by mechanical mixing of poly(vinyl chloride), product obtained by grafting as hereinbefore indicated, and other just mentioned additives.

The bottles obtained from the compositions have a volume of 360 cm.³; they have been produced by an extruder Troester UP 30 and with a bottle-forming apparatus M.A.S.

The compositions and the characteristics of the bottles are given in Table 2.

The Examples 5 to 13 clearly show that the utilization of compositions, in accordance with the invention, allows the employment of resins of high molecular poly(vinyl chloride) for the manufacture of containers. In addition, it is evident that the compositions of the invention have excellent processability characteristics with respect to poly(vinyl chloride) compositions containing well-known processing additives, such as Paraloid K 120 N (Example $R_2$) and finally divided polyethylene (Examples $R_3$ and $R_4$).

The bottles obtained from the compositions of Examples 5 to 13 have better characteristics than bottles obtained with the usual ingredients used hitherto (Examples $R_2$ to $R_4$) and especially a good surface appearance, an excellent transparency and no initial color of the bottles.

It has been noted that the use of the products A, B and C does not reduce the thermal stability of the resins, but it reduces the appearance of the yellow color of the extruded product in opposition with the compositions containing a methyl methacrylate/ethyl acrylate copolymer.

Moreover, it is also apparent that the incorporation of these products has reduced the melt viscosity and suppressed the sticking of the composition in the extruder.

EXAMPLES 17 to 21

This series of examples shows the excellent processing-aid effect of the invention additives on low and high molecular poly(vinyl chloride) and the good impact-resistance of bottles prepared with these compositions.

Example 21 shows the results of a 24-hour industrial test at a very high rate of production of bottles (1150 flasks per hour). This rate of production is 20% higher than that generally used on an extruder Bekum HDB 110, which has been employed for Examples 17 to 25, and the processing in Example 21 occurred without hooking and gluing. The bottles produced have a volume of 1000 cm.³.

The amount of products A and B forming a part of these compositions is given in Table 4.

The resin stabilization is obtained by means of 5.2 parts of a mixture consisting of calcium stearate, zinc ethylhexanoate and epoxidized soya-bean oil. The lubrication is carried out with 1.2 parts of an ester of mortanic acid containing 20% of calcium montanate and marketed under the trade name Cire OP. The filler used is a methyl methacrylate butadiene/styrene graft polymer marketed under the trade name Kireha BTA 3.

The impact resistance test designated H 50 is carried out with a series of samples of 100 flasks selected from a production. A first bottle, filled with water at 20° C. and corked, is allowed to fall from a height appraised by an approach method on a plate anvil, without a water film. The bottles are guided by 6 fine nylon threads to a point of impact. A second bottle is allowed to fall from a height of 10 cm. above the previous level, if the first bottle has resisted the fall, and 10 cm. under the previous level if the first bottle has not resisted and so on.

It is then possible to calculate the average height required to have 50% of the bottles broken. This value is given in Table 4.

Examples $R_{17}$ and $R_{19}$ are given by way of comparison.

TABLE 4

| | Examples | | | | |
|---|---|---|---|---|---|
| | $R_{17}$ | $R_{18}$ | $R_{19}$ | 20 | 21 |
| Compositions: | | | | | |
| Poly(vinyl chloride) K 53 value (Solvic 223) | 100 | 100 | 100 | 100 | |
| K 60 value (Solvic 227) | | | | | 100. |
| Paraloid K 120 | | 1 | 1 | | |
| Filler | | | 10 | 10 | 10. |
| Product A | | | | 1 | |
| Product B | | | | | 1. |
| Properties: | | | | | |
| Production rate, bottle/hour | 700 | 700 | 800 | 900 | 1,150. |
| Impact-resistance height, m | | 0.80 | 1.50 | 1.50 | 2.00. |
| Characteristics of the bottles: | | | | | |
| Appearance | Fair | Fair | Good | Good | Good. |
| Color | No color | No color | No color | No color | No color. |
| Transparency | Transparent | Transparent | Transparent | Transparent | Transparent. |
| Remarks, re. processability | Sticking during the working up | Fair | Processing-aid effect Fair | Excellent | Excellent. |

EXAMPLES 14 TO 16

These examples are carried out in the same manner as Examples 1 to 13, but using a higher molecular poly(vinyl chloride), having K value of 66.

The compositions and characteristics of the bottles obtained are set forth in Table 3.

Examples $R_{14}$ and $R_{15}$ are given by way of comparison.

EXAMPLES 22 to 25

These examples are carried out in the same manner as Examples 17 to 21.

This series of examples shows that it is possible to reduce to one half, the quantity of filler in the compositions, in accordance with the invention, when a suffi-

TABLE 3

| | Examples | | |
|---|---|---|---|
| | $R_{14}$ | $R_{15}$ | 16 |
| Compositions: | | | |
| Poly(vinyl chloride) K value: 66 (Solvic 239) | | 100 | |
| Paraloid K 120 N | 2 | | 2. |
| Product A | | 2 | |
| Lubricant | 1.5 | 1.5 | 1.5 |
| Stabilizing substance | 2 | 2 | 2. |
| Characteristics of the bottles: | | | |
| Appearance | Bad and shark skin appearance | Bad and shark skin appearance inside and outside the bottle. | Good, transparent. |
| Color | Very colored | Very colored | Weakly colored. |
| Processability, etc | Stocking and decomposition during the working up. | Processing-aid effect fair | Excellent processing-aid effect. | ciently high molecular weight poly(vinyl chloride) is employed. Using the invention additives, the excellent properties of the impact resistance, as well as the transparency, appearance and the absence of color of the obtained bottles are retained. The stabilization and the lubrication of the compositions are carried out in the same manner as in Examples 17 to 21.

Example $R_{22}$ is given by way of comparison.

the product obtained by vinyl chloride polymerization in the presence of ethylene polymer.

3. Plastic composition accordnig to claim 1, which further comprises 0.5 to 20% by weight with respect to the poly(vinyl chloride) base of at least one filler, which improves the impact-resistance of poly(vinyl chloride).

4. A hollow body comprised of the plastic composition defined in claim 1.

TABLE 5

| | Examples | | | |
|---|---|---|---|---|
| | $R_{22}$ | 23 | 24 | 25 |
| Compositions: | | | | |
| Poly(vinyl chloride) | | | | |
| K 59 value (Solvic 229) | | | | 100. |
| K 60 value (Solvic 227) | | | 100 | |
| K 53 value | 100 | 100 | | |
| Paraloid K 120 N | 1 | | | |
| Filler (Kureha BTA 3) | 10 | 10 | 5 | 5. |
| Product A | | 1 | 1 | 1. |
| Properties: Impact-resistance height, m | 1.55 | 1.60 | 2.05 | 2.16 |
| Characteristics of the bottles: | | | | |
| Appearance | Good | Good | Good | Good. |
| Color | No color | No color | No color | No color. |
| Transparency | Transparent | Transparent | Transparent | Transparent. |
| Notes re. processability | Weak gluing during the working up, process-aid effect fair. | Excellent processing-aid effect | | |

What I claim and desire to secure by Letters Patent is:

1. Plastic composition based on poly(vinyl chloride) which can be converted into transparent hollow bodies comprised of poly(vinyl chloride) as the base material and from 0.1 to 5% by weight with respect to the poly(vinyl chloride) of the resin product obtained by the polymerization of vinyl chloride in the presence of an ethylene polymer selected from the group consisting of ethylene homopolymers and ethylene copolymers containing from 0.4 to 6 mole percent of another α-olefin, said ethylene polymer having a melt index of 0.3 to 40 and also having either the characteristic of from 0.2 to 4 double bonds per 1000 carbon atoms, or the characteristic of 5 to 30 methyl groups per 1000 carbon atoms or both of said characteristics and under a partial pressure of vinyl chloride constantly below the saturated vapor pressure of vinyl chloride at the polymerization temperature, the total amount of ethylene polymer in said production being equal or less than 2.5% by weight with respect to said poly(vinyl chloride) base.

2. Plastic composition according to claim 1, wherein said composition contains from 0.2 to 2% by weight of 5. A hollow body comprised of the plastic composition defined in claim 3.

6. Plastic composition according ot claim 1, in which said product obtained by the polymerization of vinyl chloride in the presence of an ethylene polymer contains a total of about 30 to 70 percent by weight of said ethylene polymer.

References Cited

UNITED STATES PATENTS 2,947,719  8/1960  Rugg et al. _____ 260—878 R
3,642,745  2/1972  Goldstein _____ 260—884

MURRAY TILLMAN, Primary Examiner

J. ZIEGLER, Assistant Examiner

U.S. Cl. X.R.

260—23 XA, 29.6 RB, 41 R, 878 R